(12) United States Patent
Suzuki et al.

(10) Patent No.: US 7,052,093 B2
(45) Date of Patent: May 30, 2006

(54) ELECTRIC PARKING BRAKE SYSTEM AND METHOD FOR CONTROLLING THE SAME

(75) Inventors: Hidetoshi Suzuki, Hamamatsu (JP); Eiji Ina, Toyohashi (JP)

(73) Assignee: Asmo Co., Ltd., Shizuoka-ken (JP)

(*) Notice: Subject to any disclaimer, the term of this patent is extended or adjusted under 35 U.S.C. 154(b) by 0 days.

(21) Appl. No.: 10/893,510

(22) Filed: Jul. 16, 2004

(65) Prior Publication Data
US 2005/0046271 A1  Mar. 3, 2005

(30) Foreign Application Priority Data
Aug. 25, 2003  (JP) ............................. 2003-300077

(51) Int. Cl.
*B60T 13/66* (2006.01)

(52) U.S. Cl. ........................ 303/20; 303/199; 188/162

(58) Field of Classification Search ............... 303/2, 303/3, 15, 124, 199, 68, 20; 188/162
See application file for complete search history.

(56) References Cited

U.S. PATENT DOCUMENTS 6,394,235 B1 * 5/2002 Poertzgen et al. ......... 188/72.6
2005/0103150 A1 * 5/2005 Willemsen et al. ........... 74/512

FOREIGN PATENT DOCUMENTS

| EP | 1236632 A1 * | 9/2002 |
| JP | 2001-039279 | 2/2001 |
| JP | 2003083373 A * | 3/2003 |
| JP | 2004066876 A * | 3/2004 |

* cited by examiner

*Primary Examiner*—Melanie Torres
(74) *Attorney, Agent, or Firm*—Synnestvedt & Lechner LLP

(57) ABSTRACT

An electric parking brake system includes motors, parking brakes, current a detection portion, a drive circuit, and a controller. The parking brakes are driven by the motors to apply braking force to wheels. The current detection portion detects the amount of current supplied to the motors. The drive circuit supplies a constant predetermined voltage to the motors. The controller controls supply of electricity to the motors. The drive circuit is controlled by the controller. When a detected current value exceeds a predetermined value, the controller stop supplying electricity to the motors.

12 Claims, 3 Drawing Sheets

ELECTRIC PARKING BRAKE SYSTEM AND METHOD FOR CONTROLLING THE SAME

BACKGROUND OF THE INVENTION

The present invention relates to an electric parking brake system and a method for controlling the electric parking brake system.

An electric parking brake system mounted, for example, to a vehicle includes an electric motor as a power source and applies braking force to wheels. Japanese Laid-Open Patent Publication No. 13-039279 discloses a method for controlling electric brakes incorporated in an electric parking brake system. A drive current or voltage applied to the motors is subjected to feedback control so that torque generated by the motors is controlled. Accordingly, the braking force applied to the wheels is controlled.

The feedback control complicates the structure and the procedures, which increases the costs. Also, abrupt changes of the load on the motors and inertial force generated based on the rotation of the motors hinder the motors from generating stable braking force.

SUMMARY OF THE INVENTION

Accordingly, it is an objective of the present invention to provide an electric parking brake system that has a simple structure and generates a stable braking force, and to a method for controlling the electric parking brake system.

To achieve the foregoing and other objectives and in accordance with the purpose of the present invention, an electric parking brake system for applying braking force to a wheel of a vehicle is provided. The system includes a motor, a parking brake, a drive circuit, a current detection portion, and a controller. The parking brake is driven by the motor to apply braking force to the wheel. The drive circuit supplies electricity to the motor to drive the motor. The current detection portion detects a current value supplied to the motor. The controller controls the drive circuit. The controller causes the drive circuit to supply electricity to the motor such that a predetermined constant voltage is supplied to the motor. When the detected current value is equal to or greater than a predetermined permissible value, the controller causes the drive circuit to stop supplying electricity to the motor.

The present invention also provides a method for controlling an electric parking brake system that includes a parking brake for applying braking force to a wheel of vehicle, and a motor for driving the parking brake. The method includes: supplying electricity to the motor to drive the motor, wherein a predetermined constant voltage is supplied to the motor; detecting a current value supplied to the motor; and stopping supplying of electricity to the motor when the detected current value is equal to or greater than a predetermined permissible value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 3.

Figures 1, 1A:
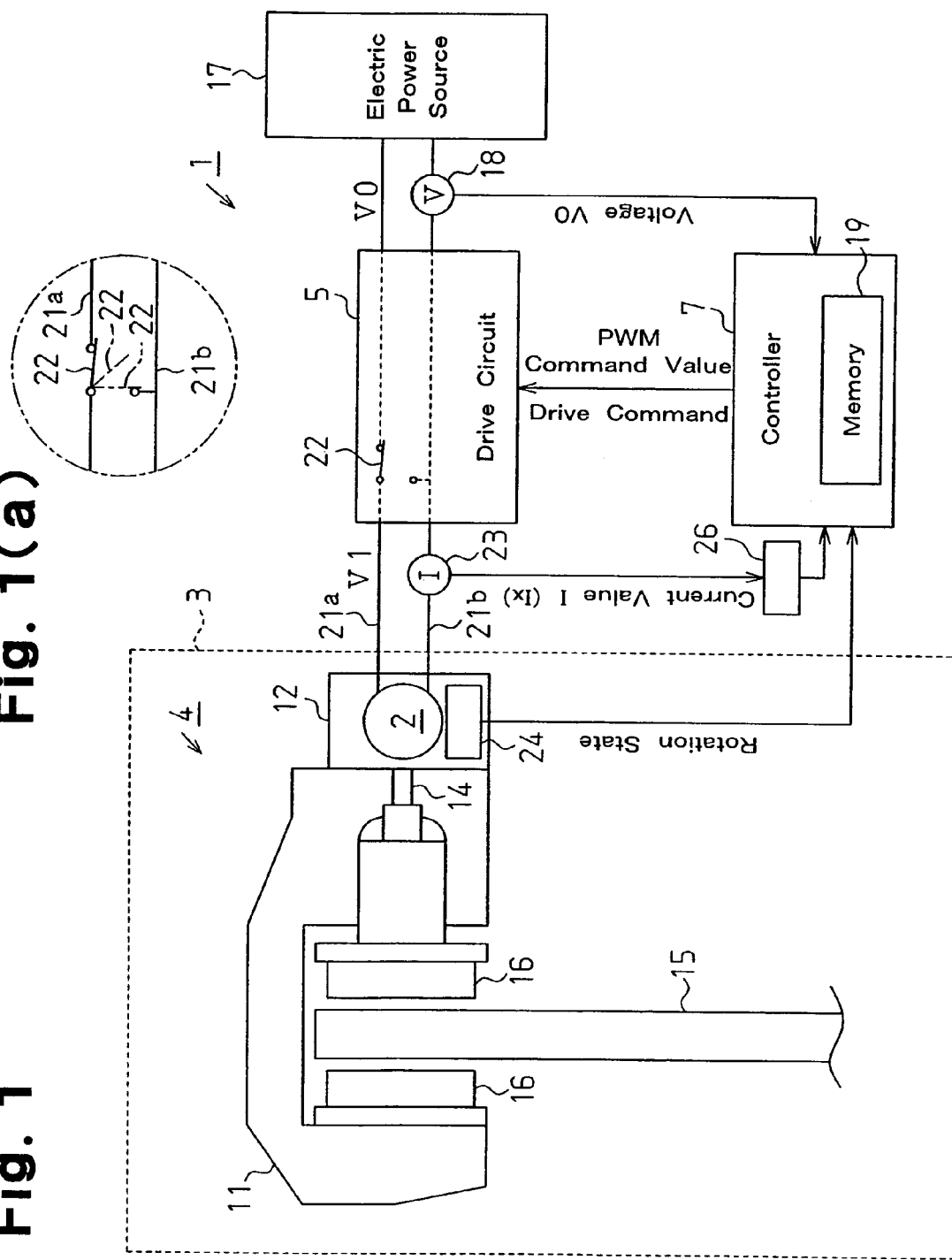
FIG. 1 is a diagram illustrating an electric parking brake system according to one embodiment of the present invention.
FIG. 1(a) is a diagram illustrating a switch incorporated in the electric parking brake system shown in FIG. 1.

FIG. 1 shows an electric parking brake system 1 mounted to a vehicle having wheels 3 (only one is shown). The electric parking brake system 1 includes electric parking brakes 4 (only one is shown), a drive circuit 5, and a controller 7 that controls the drive circuit 5. Each electric parking brake 4 is mounted to one of at least two of the wheels 3. Each electric parking brake 4 has a power source, which is an electric motor 2. Using the motor 2, each electric parking brake 4 applies braking force to the corresponding wheel 3. The drive circuit 5 supplies drive electricity to the motors 2.

Each electric parking brake 4 includes a braking portion 11 for applying braking force to the corresponding wheel 3, and an actuator 12 that actuates the braking portion 11. The actuator 12 converts forward and reverse rotations of the motor 2 into reciprocation of an output shaft 14 along an axial direction. The braking portion 11 includes a rotor 15 that rotates integrally with the corresponding wheel 3, and a pair of frictional members 16 that contact or separate from the rotor 15 in accordance with reciprocation of the output shaft 14.

When the braking portion 11 is actuated by the actuator 12, and the frictional members 16 are caused to approach and pressed against the rotor 15, braking force is applied to the wheel 3. On the other hand, when the frictional members 16 separate from the rotor 15, the brake 4 is disengaged.

The motor 2 of each electric parking brake 4 (the actuator 12) is connected to an electric power source 17 of the vehicle with the drive circuit 5. When the drive circuit 5 supplies driving electricity to the motor 2, the motor 2 rotates. The drive circuit 5 is connected to the controller 7. Based on a drive command supplied by the controller 7, the drive circuit 5 supplies or stops drive electricity to the motors 2. When the controller 7 controls the electricity supplied to each motor 2, rotation of the motor 2 is controlled. Accordingly, the operation of the electric parking brake 4 is controlled. In this embodiment, wiring that connects the motors 2, the drive circuit 5, and the electric power source 17 to one another, and circuits in the drive circuit 5 form an electricity supplying path.

The controller 7 outputs to the drive circuit 5 a drive command, which is a PWM command value (duty ratio), thereby controlling the electricity supplied to the motors 2. The drive circuit 5 is controlled by the controller 7 to supply a predetermined constant voltage V1 to the motors 2.

The controller 7 is connected to a voltage sensor 18 that detects a voltage V0 of the vehicle electric power source 17. Based on the detected power source voltage V0, the controller 7 obtains a PWM command value (duty ratio) that makes voltage supplied to the motor 2 a predetermined voltage V1, and supplies the PWM command value to the drive circuit 5. Based on the PWM command value from the controller 7, the drive circuit 5 transforms the power source voltage V0 to the voltage V1 and supplies the voltage V1 to the motors 2.

As the predetermined voltage V1, an optimal value is obtained through experiments (including computations and simulations) and is stored in a memory 19 of the controller 7 in advance.

As shown in FIG. 1(a), the drive circuit 5 has a switch 22 that is switched among a closed circuit state (see solid line), a short-circuit state (see alternate long and two short dashes line), and an open circuit state. When at the closed circuit state, the switch 22 closes the electricity supplying path. When at the short-circuit state, the switch 22 short-circuits terminals 21a, 21b connected to the motors 2. When at the open circuit state, the switch opens the electricity supplying path and does not short-circuit the terminals 21a, 21b. The drive circuit 5 is controlled by the controller 7. In this present embodiment, the controller 7, the drive circuit 5, and the switch 22 form a switching portion.

The electric parking brake system 1 includes a current sensor 23 for detecting the current value I supplied to the motors 2, and rotation sensors 24 for detecting the rotation state of the motors 2. The current sensor 23 and the rotation sensors 24 are connected to the controller 7. Based on signals from the current sensor 23 and the rotation sensors 24, the controller 7 detects the current value I supplied to the motors 2 and the rotation state of each motor 2.

The current sensor 23 is connected to the controller 7 with a low pass filter 26 in between. A signal from the current sensor 23 is supplied to the controller 7 through the low pass filter 26. Each rotation sensor 24 includes a ring magnet and a Hall IC. The ring magnet is arranged such that magnetic flux passing through the Hall IC is changed periodically in accordance with rotation of the corresponding motor 2. Each rotation sensor 24 outputs a pulse signal the level of which changes in accordance with rotation of the corresponding motor 2. Based on the pulse signal, the rotation sensor 24 detects the rotation state of the motor 2. In this embodiment, the controller 7, the current sensor 23, and the low pass filter 26 form a current detection portion. The controller 7 and the rotation sensors 24 form a rotation detection portion.

The operation of the electric parking brake system 1 will now be described.

Figure 2A:
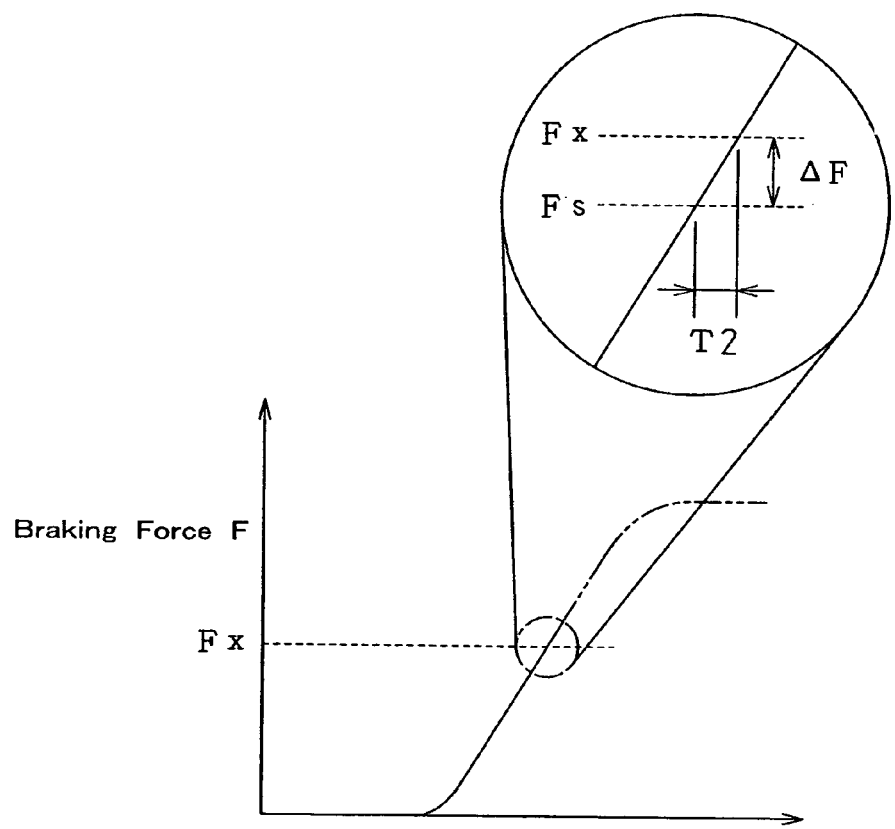
FIG. 2(a) is a time chart showing braking force generated by an electric parking brake.
Figure 2B:
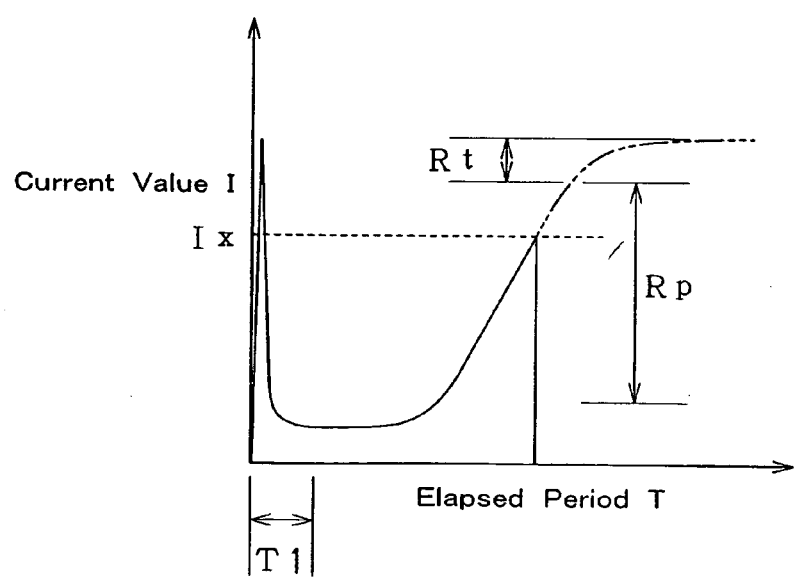
FIG. 2(b) is a time chart showing a current value supplied to a motor when the parking brakes are applied.

FIG. 2(a) is a time chart showing braking force generated by one of the electric parking brakes 4, and FIG. 2(b) is a time chart showing a current value supplied to the motor 2 when the parking brake 4 is applied. FIG. 3 is a flowchart showing a procedure performed by the controller 7 when the parking brake is applied.

When applying the parking brakes 4, except at starting the motors 2, the electric parking brake system 1 stops supplying electricity to the motors 2 and opens the terminals 21a, 21b connected to the motors 2. or puts the terminals 21a, 21b to the open circuit state. After rotation of the motors 2 due to inertia is stopped, the terminals 21a, 21b are short-circuited, and the parking brakes 4 are engaged.

Specifically, when applying the parking brakes 4, the current value I supplied to the motors 2 is abruptly increased at the same time as the electricity starts being supplied due to a high load applied to the motors 2 until the motors 2 start rotating. Thereafter, the current value I is decreased as the load due to inertia is lowered as the rotation of the motors 2 starts. When each motor 2 start rotating at a constant speed substantially without load, in other words, when the frictional members 16 approaches the rotor 15, the current value I has a constant value (no load current).

As shown in FIG. 2(b), a period from when the electricity starts being supplied to when the motor 2 starts rotating at a constant speed corresponds to a predetermined period T1. From when each motor 2 is started until the predetermined period T1 has elapsed, the electric parking brake system 1 does not stop supplying electricity to the motors 2 even if the current value I is equal to (or exceeds) the predetermined current value Ix. In this embodiment, the predetermined period T1 is set to 0.1 seconds.

Subsequently, when rotation of the motor 2 causes the frictional members 16 to be pressed against the rotor 15, the electric parking brake 4 generates a braking force F (see FIG. 2(a)). The current value I of the motor 2 is increased as the load is increased. In this embodiment, since the constant voltage V1 is supplied to the motor 2, the torque (braking torque) generated by the motor 2 is increased in proportion to the current value I until the motor 2 is in a lockup state, or until rotation of the motor 2 is substantially stopped. Therefore, the braking force F generated by the electric parking brake 4 is increased substantially in proportion to the current value I.

In this embodiment, a region of the current value I where rotation of the motor 2 is substantially in the lockup state, or a region where the current value I has value close to a lockup current, is defined as a lockup region Rt. A region of the current value I where, after the braking force F is generated, the torque generated by the motor 2 is increased substantially in proportion to the current value I to the lockup region Rt is defined as a proportional region Rp.

The predetermined current value Ix is set in the proportional region Rp where the torque generated by each motor 2 increases substantially in proportion to the current value I supplied to the motor 2. When the current value I supplied to the motors 2 is equal to a predetermined current value Ix, the electric parking brake system 1 stops supplying electricity to the motors 2 and puts the terminals 21a, 21b connected to the motors 2 to the open circuit state. When rotation of the motors 2 is stopped, the electric parking brake system 1 short-circuit the terminals 21a, 21b, thereby completing the engagement of the parking brakes 4 (see FIG. 1).

In general, the motors 2 rotate for a certain period (50μ seconds to 100μ seconds) after the current to the motors 2 is stopped. Therefore, the frictional members 16 and the rotors 15 of the electric parking brakes 4 are further pressed against each other. Therefore, the braking force F generated by the electric parking brakes 4 is increased to a braking force Fx that is computed by adding an amount of braking force ΔF due to rotation of the motor 2 by the inertia to the braking force F at the time of current supply is stopped.

On the other hand, in this embodiment, since the constant voltage V1 is applied to the motor 2, the torque generated by the motors 2 when electricity supply is stopped is stabilized at a constant value that corresponds to the predetermined current value Ix. Therefore, the braking force ΔF that added due to inertial rotation of the motor 2 is stabilized. As a result, the braking force Fx generated by the electric parking brake 4 is maintained at a substantially constant value that corresponds to the predetermined current value Ix.

In this embodiment, data representing the relationship between the current value Ix at which electricity supply is stopped and the braking force Fx generated by each electric parking brake 4 is obtained in advance through experiments (including computations and simulations) and stored in the memory 19 of the controller 7. The controller 7 optimally sets the current value Ix by referring to the data when applying the parking brakes 4.

The operation of the controller 7 when applying the parking brakes 4 will now be described.

Figure 3:
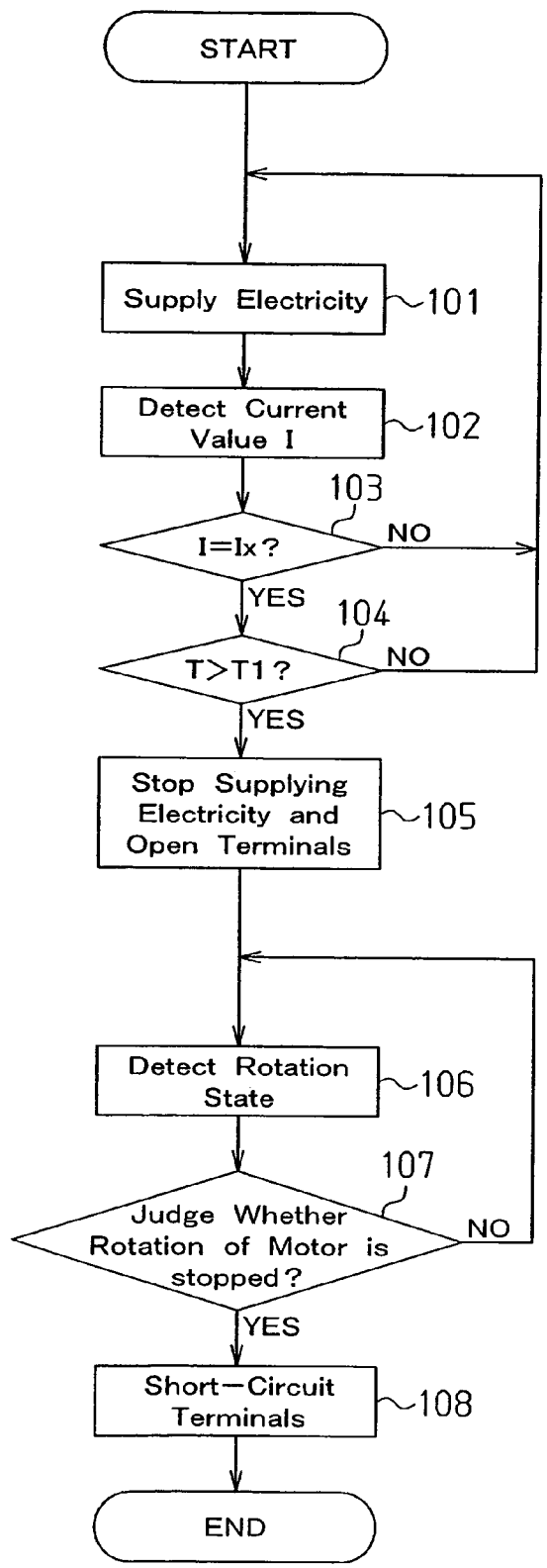
FIG. 3 is a flowchart showing a procedure performed by a controller when the parking brakes are applied.

When applying the parking brakes 4, the controller 7 first outputs a drive command to the drive circuit 5 and starts supplying electricity to the motors 2 as shown in FIG. 3 (step 101). Then, the controller 7 detects the current value I supplied to the motors 2 (step 102). Next, the controller 7 judges whether the current value I is equal to the predetermined current value Ix (step 103). The controller 7 repeats steps 101 to 103 until the current value I becomes equal to the predetermined current value Ix.

If the outcome of step 103 is YES, that is, when the current value I reaches the predetermined current value Ix, the controller 7 judges whether the elapsed period T from when the electricity supply to the motors 2 is started has reached the predetermined period T1 (step 104).

When the outcome of step 104 is YES, that is, when the predetermined period T1 has elapsed, the controller 7 stops supplying electricity to the motors 2, and puts the terminals 21a, 21b connected to the motors 2 to the open circuit state. Specifically, the controller 7 sets the PWM command value, which is supplied to the drive circuit 5 as a drive command, to zero. Based on the PWM command value, the drive circuit 5 stops supplying electricity to the motors 2, and actuates the switch 22 to put the terminals 21a, 21b connected to the motors 2 (step 105) to the open circuit state.

On the other hand, when the outcome of step 104 is NO, that is, when the predetermined period T1 has not elapsed, the controller 7 returns to step 101 and repeats steps 101 to 103 until the current value I reaches the predetermined current value Ix.

After stopping supplying electricity to the motors 2 in step 105, the controller 7 detects the rotation state of the motors 2 (step 106). Next, the controller 7 judges whether rotation of the motors 2 is stopped (step 107). The controller 7 repeats steps 106 and 107, and when rotation of the motors 2 is stopped, the controller 7 short-circuits the terminals 21a, 21b connected to the motors 2, thereby completing the engagement of the parking brakes 4. Specifically, the drive circuit 5 is controlled by the controller 7 to actuate the switch 22, thereby short-circuiting the terminals 21a, 21b of the motor 2 (step 108).

This embodiment provides the following advantages.

(1) When applying the parking brakes 4, the controller 7 stops supplying electricity to the motor 2 when the current value I supplied to the motor 2 reaches the predetermined current value Ix.

This configuration permits the torque generated by the motor 2 when the electricity supply is stopped to be stabilized at a constant value that corresponds to the predetermined current value Ix. The additional braking force F due to inertial rotation is also stabilized. Therefore, the braking force Fx generated by the electric parking brakes 4 is maintained at a substantially constant value that corresponds to the predetermined current value Ix. As a result, a stable braking force is generated with a simple structure.

(2) The predetermined current value Ix is set in the proportional region Rp where the torque generated by the motors 2 increases substantially in proportion to the current value I supplied to the motors 2. This configuration permits the motor 2 to be substantially in the lockup state. Also, since electricity is not supplied in the lockup region Rt, where the braking force F is increased at a small rate relative to a time in which the current is supplied (elapsed time T), a high electricity conversion efficiency is obtained. As a result, the power consumption is reduced.

(3) After electricity to the motor 2 is stopped, the terminals 21a, 21b connected to the motors 2 are put to the open circuit state. Then, after rotation of the motor 2 is stopped, the terminals 21a, 21b are short-circuited. This configuration prevents abrupt changes in the rotation state of the motors 2 when the supply of electricity is stopped. Accordingly, there are little or no impact forces on the mechanism that converts rotation of each motor 2 to reciprocation of the frictional members. As a result, the mechanism can be designed for relatively low stress, thereby reducing costs. Also, since the terminals 21a, 21b of the motor 2 are short-circuited after rotation of the motors 2 is stopped, the retaining force of the electric parking brakes 4 (that is, maintenance of the braking force generated by the electric parking brakes 4) is improved.

(4) From when the motors 2 are started until the predetermined period T1 has elapsed, the supply of electricity to the motors 2 is not stopped even if the current value I is equal to (or exceeds) the predetermined current value Ix. Therefore, since the supply of electricity to the motors 2 is not stopped when the motors 2 are started, the response of the electric parking brakes 4 is improved.

(5) A signal from the current sensor 23 is supplied to the controller 7 through the low pass filter 26. The low pass filter 26 prevents misoperations due to noises.

It should be apparent to those skilled in the art that the present invention may be embodied in many other specific forms without departing from the spirit or scope of the invention. Particularly, it should be understood that the invention may be embodied in the following forms.

In the illustrated embodiment, the rotation state of the motors 2 is detected by the rotation sensors 24, and the terminals 21a, 21b of the motor 2 are short-circuited after rotation of the motors 2 is stopped. This may be modified. For example, a period of sufficient length for allowing supply of electricity to the motors 2 to be stopped and rotation of the motors 2 to be stopped (no shorter than 50μ seconds and no longer than 100μ seconds) may be set as a predetermined period T2 (see FIG. 2(*a*)), and the terminals 21a, 21b connected to the motors 2 may be short-circuited after the predetermined period T2 has elapsed.

The low pass filter 26 may be an electric hardware or a software.

The electric parking brakes 4 may be disc brakes or drum brakes. When disc brakes are applied, brake discs and brake pads correspond to the rotors 15 and the frictional members 16. When drum brakes are applied, brake drums and shoes correspond to the rotor 15 and the frictional members 16.

Each electric parking brake 4 may include an integrated braking portion and actuator. Alternatively, each electric parking brake 4 may include a braking portion and an actuator separated from each other.

The present invention may be applied to electric parking brakes that incorporates a drive circuit.

Therefore, the present examples and embodiments are to be considered as illustrative and not restrictive and the invention is not to be limited to the details given herein, but may be modified within the scope and equivalence of the appended claims.

The invention claimed is:

1. An electric parking brake system for applying braking force to a wheel of a vehicle, comprising:
   a motor;
   a parking brake that is driven by the motor to apply braking force to the wheel;

a drive circuit that supplies electricity to the motor via an electricity supplying path to drive the motor;

a current detection portion for detecting a current value supplied to the motor;

a controller for controlling the drive circuit, wherein the controller causes the drive circuit to supply electricity to the motor such that a predetermined constant voltage is supplied to the motor, wherein, when the detected current value is equal to or greater than a predetermined permissible value, the controller causes the drive circuit to stop supplying electricity to the motor;

at least two terminals located in the electricity supplying path and connected to the motor;

a rotation detection portion that detects a rotation state of the motor; and a switching portion that is switched among a short-circuit state for short-circuiting the terminals, a closed circuit state for closing the electricity supplying path, and an open circuit state to open the electricity supplying path, wherein the switching portion is switched from the closed circuit state to the open circuit state when the supply of electricity to the motor is stopped, and the switching portion is switched from the open circuit state to the short-circuit state when the rotation detection portion detects that rotation of the motor is stopped after the supply of electricity to the motor is stopped.

2. The electric parking brake system according to claim 1, wherein the permissible value is less than a value of current that corresponds to a state in which the motor is locked up.

3. The electric parking brake system according to claim 1, wherein the permissible value is set in a region in which braking torque generated by the motor is substantially in proportion to the value of current supplied to the motor.

4. The electric parking brake system according to claim 1, wherein, until a predetermined period has elapsed after the motor is started, the controller controls the drive circuit not to stop supplying electricity to the motor even if the detected current value is equal to or greater than the permissible value.

5. The electric parking brake system according to claim 4, wherein the predetermined period corresponds to a period from when electricity starts being supplied to the motor to when the motor starts rotating at a constant speed.

6. The electric parking brake system according to claim 4, wherein the predetermined period is set to substantially 0.1 seconds.

7. The electric parking brake system according to claim 1, further comprising a low pass filter, wherein a signal outputted from the current detection portion is sent to the drive circuit via the low pass filter.

8. An electric parking brake system for applying braking force to a wheel of a vehicle, comprising:

a motor;

a parking brake that is driven by the motor to apply braking force to the wheel;

a drive circuit that supplies electricity to the motor via an electricity supplying path to drive the motor;

a current detection portion for detecting a current value supplied to the motor;

a controller for controlling the drive circuit, wherein the controller causes the drive circuit to supply electricity to the motor such that a predetermined constant voltage is supplied to the motor, wherein, when the detected current value is equal to or greater than a predetermined permissible value, the controller causes the drive circuit to stop supplying electricity to the motor;

at least two terminals located in the electricity supplying path and connected to the motor; and a switching portion that is switched among a short-circuit state for short-circuiting the terminals, a closed circuit state for closing the electricity supplying path, and an open circuit state to open the electricity supplying path, wherein the switching portion is switched from the closed circuit state to the open circuit state when the supply of electricity to the motor is stopped, and the switching portion is switched from the open circuit state to the short-circuit state when a predetermined period has elapsed after the supply of electricity to the motor is stopped.

9. A method for controlling an electric parking brake system that includes a parking brake for applying braking force to a wheel of vehicle, and a motor for driving the parking brake, the method comprises:

supplying electricity to the motor to drive the motor, wherein a predetermined constant voltage is supplied to the motor;

detecting a current value supplied to the motor;

stopping supplying of electricity to the motor when the detected current value is equal to or greater than a predetermined permissible value;

detecting a rotation state of the motor;

switching an electricity supply path connected to two terminals of the motor from a closed circuit state to an open circuit state when the supply of electricity to the motor is stopped; and short-circuiting the terminals when rotation of the motor is detected to be stopped after the supply of electricity to the motor is stopped.

10. The control method according to claim 9, wherein the permissible value is set in a region in which torque generated by the motor is substantially in proportion to the current value.

11. The control method according to claim 9, wherein, until a predetermined period has elapsed after the motor is started, supply of electricity to the motor is not stopped even if the detected current value is equal to or greater than the permissible value.

12. A method for controlling an electric parking brake system that includes a parking brake for applying braking force to a wheel of vehicle, and a motor for driving the parking brake, the method comprises:

supplying electricity to the motor to drive the motor, wherein a predetermined constant voltage is supplied to the motor;

detecting a current value supplied to the motor;

stopping supplying of electricity to the motor when the detected current value is equal to or greater than a predetermined permissible value;

switching an electricity supply path connected to two terminals of the motor from a closed circuit state to an open circuit state when the supply of electricity to the motor is stopped; and short-circuiting the terminals when a predetermined period has elapsed after the supply of electricity to the motor is stopped.

* * * * *